US010479667B2

(12) United States Patent
Kirzinger

(10) Patent No.: US 10,479,667 B2
(45) Date of Patent: Nov. 19, 2019

(54) APPARATUS AND METHOD FOR TREATING CONTAINERS AND PACKAGES WITH FLYING MACHINE FOR MONITORING

(71) Applicant: KRONES AG, Neutraubling (DE)

(72) Inventor: Johannes Kirzinger, Unterhaching (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 15/759,107

(22) PCT Filed: Sep. 8, 2016

(86) PCT No.: PCT/EP2016/071140
§ 371 (c)(1),
(2) Date: Mar. 9, 2018

(87) PCT Pub. No.: WO2017/042251
PCT Pub. Date: Mar. 16, 2017

(65) Prior Publication Data
US 2018/0288372 A1    Oct. 4, 2018

(30) Foreign Application Priority Data
Sep. 9, 2015  (DE) .................. 10 2015 115 184

(51) Int. Cl.
*B67C 3/00*     (2006.01)
*B64C 39/02*    (2006.01)
*B67C 3/22*     (2006.01)
(52) U.S. Cl.
CPC ............ *B67C 3/007* (2013.01); *B64C 39/024* (2013.01); *B64C 2201/024* (2013.01);
(Continued)

(58) Field of Classification Search
CPC combination set(s) only.
See application file for complete search history.

(56) References Cited

U.S. PATENT DOCUMENTS 8,806,840 B2    8/2014   Birschneider ........... B67C 3/007
8,909,389 B2 *  12/2014  Meyer .................. A01B 69/008
                                                        460/1

(Continued)

FOREIGN PATENT DOCUMENTS

CN    104049625      9/2014    ........... G05B 19/418
DE    202012100128   4/2012    ................ E03F 7/00
(Continued)

OTHER PUBLICATIONS

German Search Report issued in application No. 10 2015 115 184.7, dated Apr. 12, 2016 (12 pgs).

(Continued)

*Primary Examiner* — Tyler W. Sullivan
(74) *Attorney, Agent, or Firm* — Hayes Soloway P.C.

(57) ABSTRACT

A device for handling containers and/or packagings, includes a first handling unit which handles the containers and/or packagings in a first predetermined manner, and a second handling unit which handles the containers and/or packagings in a second predetermined manner, a transport unit for transporting the containers and/or packagings, and a monitoring unit for monitoring the device. The monitoring unit includes an unmanned and remote-controlled flying device and a control unit for wirelessly controlling the flying device, wherein the flying device has an image capturing unit, and wherein the device has a delimiting unit which delimits a flying region of the flying device.

16 Claims, 1 Drawing Sheet

(52) U.S. Cl.
CPC .. *B64C 2201/027* (2013.01); *B64C 2201/123* (2013.01); *B64C 2201/126* (2013.01); *B64C 2201/127* (2013.01); *B64C 2201/14* (2013.01); *B64C 2201/146* (2013.01); *B67C 2003/227* (2013.01)

(56) References Cited

U.S. PATENT DOCUMENTS

| | | | | |
|---|---|---|---|---|
| 9,073,637 | B2 | 7/2015 | Ohtomo et al. | B64C 39/024 |
| 9,650,136 | B1* | 5/2017 | Haskin | B64D 1/12 |
| 9,738,381 | B1* | 8/2017 | Loud | B64C 39/024 |
| 10,246,186 | B1* | 4/2019 | Beckman | B64C 39/024 |
| 2014/0034776 | A1 | 2/2014 | Hutson | 244/17.17 |
| 2014/0139643 | A1* | 5/2014 | Hogasten | H01L 27/14609 348/48 |
| 2014/0371952 | A1 | 12/2014 | Ohtomo et al. | B64C 39/024 |
| 2015/0145954 | A1* | 5/2015 | Pulleti | B64C 39/02 348/46 |
| 2016/0116914 | A1* | 4/2016 | Mucci | G05D 1/101 701/2 |
| 2016/0189549 | A1* | 6/2016 | Marcus | G08G 5/0034 701/3 |
| 2016/0244187 | A1* | 8/2016 | Byers | B64C 39/024 |
| 2016/0327946 | A1* | 11/2016 | Koga | B64C 39/024 |
| 2017/0069214 | A1* | 3/2017 | Dupray | G08G 5/0021 |
| 2017/0227965 | A1* | 8/2017 | Decenzo | H04L 67/025 |
| 2018/0151045 | A1* | 5/2018 | Kim | B64C 39/024 |

FOREIGN PATENT DOCUMENTS

| | | | |
|---|---|---|---|
| DE | 102014015472 | 4/2015 | G01M 99/00 |
| EP | 2284120 | 2/2011 | B65B 57/02 |
| EP | 2711158 | 3/2014 | B29C 49/36 |
| EP | 2813914 | 12/2014 | G05D 1/10 |
| EP | 2818958 | 12/2014 | B64C 39/02 |

OTHER PUBLICATIONS

International Search Report and Written Opinion (w/translation) issued in application No. PCT/EP2016/071140, dated Nov. 17, 2016 (18 pgs).

Chinese Office (w/translation) issued in application No. 201680052173.5, dated Jul. 23, 2019 (22 pgs).

* cited by examiner

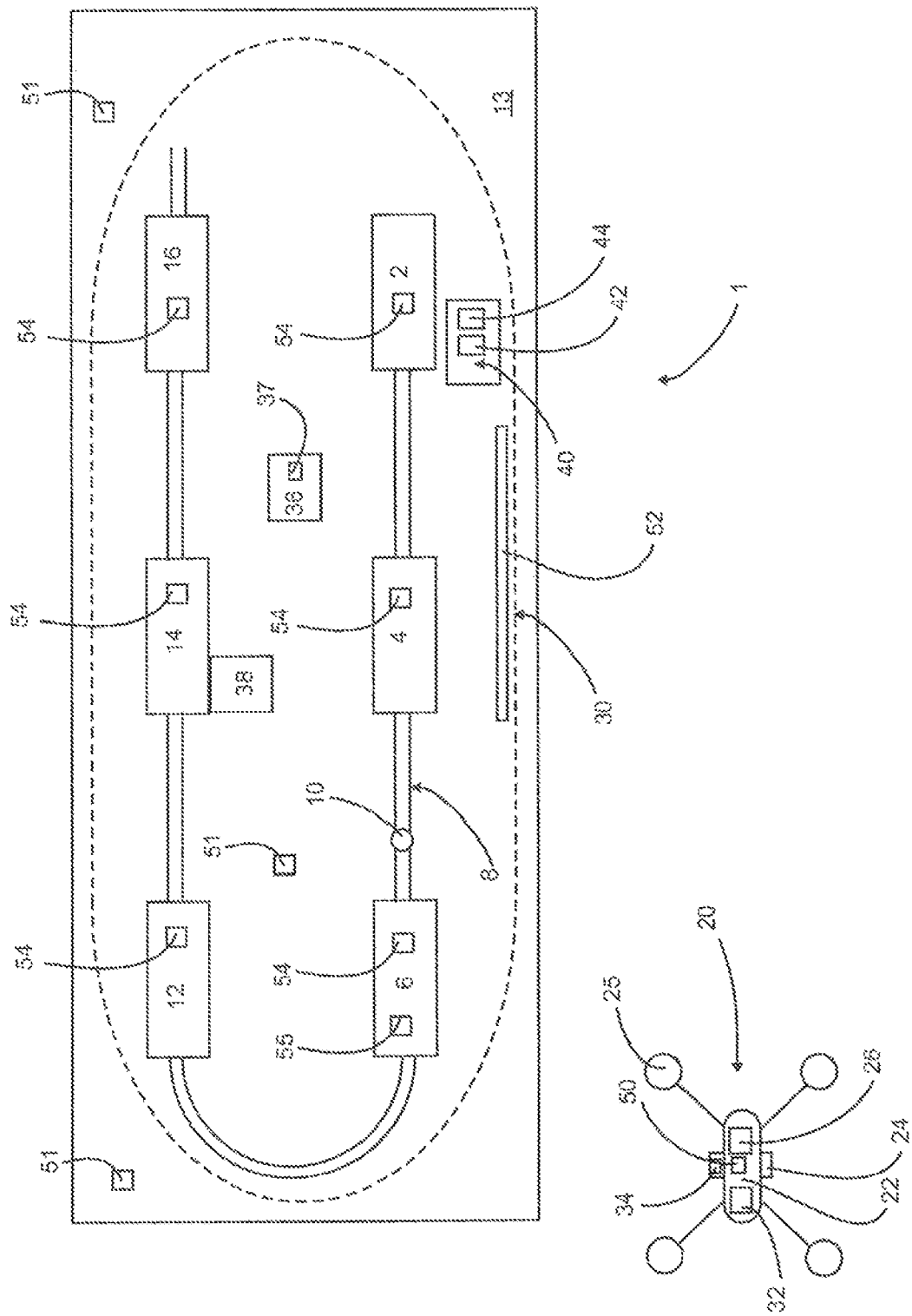

APPARATUS AND METHOD FOR TREATING CONTAINERS AND PACKAGES WITH FLYING MACHINE FOR MONITORING

BACKGROUND OF THE INVENTION

The present invention relates to an apparatus for treating containers and/or packaging material. The prior art discloses widely varying apparatus for treating containers or packaging material. Normally, such plants are highly complex and have a plurality of plant components such as for example blow-moulding machines, filling machines, palletisers and similar. Therefore in operation of such plants, monitoring can be correspondingly difficult, in particular fault search in such plants. Normally, such plants are operated from a central control device for example, and from his operating location, a user cannot see all faults occurring. In addition, faults or even accidents may occur because users or persons stand in regions which are dangerous for them.

The present invention is therefore based on the object of facilitating the fault location work in such plants. In addition, the present invention is based on the object of increasing operating safety. Furthermore, the degree of automation should be increased, in particular in filling and packing plants.

SUMMARY OF THE INVENTION

An apparatus for treating and/or processing containers and/or packages comprises a first treatment device which treats the containers and/or packages in a first predefined fashion. Furthermore, the apparatus comprises a second treatment device which treats the containers and/or packages in a second predefined fashion. In addition, a transport device is provided for transporting the containers and/or packages. Furthermore, the apparatus comprises a monitoring device for monitoring the apparatus and/or an assistance device for transporting objects.

According to the invention, the monitoring device and/or assistance device comprises an unmanned remote-controlled flying machine and a control device for wireless control of this flying machine, wherein the flying machine preferably has an image-recording device and wherein the apparatus has a limiting device which limits a flying region of the flying machine. The flying machine may in particular, but not exclusively, be a drone, a helicopter or similar. Additionally or alternatively, the flying machine may also comprise a holding and/or gripping device for holding and/or gripping objects.

A treatment process on a container means in particular processing procedures such as filling the containers, labelling the containers, sterilising the containers, printing the containers and similar. Accordingly, at least one treatment device is selected from a group of treatment devices which contain ovens for heating preforms, apparatus for forming plastic preforms into plastic containers, sterilisation devices for sterilising plastic preforms or plastic bottles, filling machines, labelling machines, shrinkage tunnels, container grouping devices, rotation and distribution systems, palletising systems, sorting systems, combinations thereof and similar.

The term "monitoring the apparatus" means in particular fault search in the case of faults, but also monitoring in the wider sense, e.g. checking whether persons are standing in an area which is not accessible to them and/or which is dangerous.

Advantageously, the flying machine is electrically powered and particularly preferably has a battery. In a further advantageous embodiment, the flying machine may have a carrier structure in order to be able to land on different surfaces. Furthermore, safety means may be provided which prevent direct contact with drive devices of the flying machine, such as propellers (or rotors) of the flying machine.

In a preferred embodiment, the flying machine comprises at least one image recording device. The at least one image recording device (in particular a camera) of the flying machine is preferably pivotable relative to at least one axis. Preferably, the image recording device is configured so as to be pivotable or rotatable relative to at least two axes. In this way, a very extensive viewing field of the image recording device can be obtained.

In a further advantageous embodiment, the flying machine may also comprise holding or gripping devices for holding or gripping objects. These objects may for example be tools or screw elements. In addition, the flying machine may also have a magnetic holding device. In this way, the flying machine can be used not only for monitoring but also for transporting tools, for example if a user requires special tools for repair purposes.

In this context, it is pointed out that instead of the image recording device, merely a gripper or holding device may be provided. The applicant reserves the right to claim protection also for such an embodiment. In this case, the flying machine is not or not merely a monitoring device, but a working device or an assistance device (which in particular serves for transporting objects). Gripping or transporting may however also serve for monitoring the plant. Such a gripper device could for example serve to transport objects such as tools but also containers. Also, working media could be transported by the flying machine, such as adhesives or packing materials or similar. Also, the flying machine could e.g. pick up a container at the outlet from a treatment device, such as a filling machine, and transport it to a laboratory for examination. Furthermore, instead of or in addition to the image recording device, detectors may be present on the flying machine which can detect the occurrence of certain substances, such as the occurrence of toxic vapours e.g. in sterilising devices. The applicant reserves the right to claim protection for such an embodiment.

Preferably, the holding or gripping means is interchangeable so that the flying machine can be configured for holding and/or gripping and/or transporting different objects.

Preferably, the apparatus is arranged in a room which is closed at least partially and preferably completely, such as in a machine hall. In this case, the problem arises that the flying machine must also be able to navigate without GPS signals. Therefore instead of or in addition to a GPS receiving unit, other receiving units may be provided which in particular cooperate with so-called beacons in order to allow navigation of the flying machine. Such beacons are in particular transmission and/or receiving units which are preferably arranged stationarily and which emit and/or receive signals serving for navigation and/or location of the flying machine.

A conceivable action area of the flying machine could be a machine hall. However, several (possibly connected) halls are also conceivable, e.g. an entire factory or several plants in one hall.

In a further advantageous embodiment, the apparatus may comprise holding means for attaching the flying machine to a ceiling of a machine hall for example. These may for example be magnetic holding means. In this way, it is possible for the flying machine in rest mode to be in a position in which for example it does not obstruct machine operators or similar. It is also possible that, in working mode, the flying machine can fly in targeted fashion to a destination position without endangering users and without colliding with other machine components.

In contrast to other remote-controlled flying machines, the area or room within which the flying machine is used is advantageously limited. This applies preferably both to the flying height and to the extension direction in a plane standing perpendicular to the vertical direction. The limiting device in particular causes the area which the flying machine can reach to be limited in all directions, or means that the flying machine can only fly within a predefined limited three-dimensional space.

In a further advantageous embodiment, the limiting device comprises at least one first transmission device which emits signals to a first receiving device arranged on the flying machine. In this preferred embodiment therefore, the flying machine comprises at least one receiving device for receiving signals, and in particular electromagnetic (in some cases also optical) signals. Thus for example it may be possible that the user is always informed of the current position of the flying machine via an image output device such as a monitor.

In a further advantageous embodiment, the flying machine comprises a transmission device for emitting signals, and in particular signals which are characteristic of the images received by the image recording device. In particular, the signals are emitted wirelessly. By means of the signals, it is possible for example to output on a display device the images which were recorded by the image recording device, for example images of a faulty element of a treatment device. Here, the images or videos can preferably be output in real time.

Advantageously, the image recording device is suitable for recording images and/or videos. In this way, faults can be detected which are only detectable during machine operation. In a further preferred embodiment, it is also possible that the control device can adjust a camera position. Thus for example, by means of the control device, the camera or also the flying machine can be swivelled.

In a further advantageous embodiment, the apparatus comprises an image output device for outputting images recorded by the image recording device. In this way, it is possible in particular that a user can observe the images recorded by the camera in real time. Thus for example, it would be possible for the user to issue instructions to a machine from a remote control unit and check how the machine reacts at a different location. In this way, fault searching can be substantially simplified.

In a further advantageous embodiment, the apparatus has a rest terminal to which the flying machine can fly to reach a rest position, or which may be accessed to achieve a rest position of the flying machine. It is possible that the control system, or where applicable the controller of the flying machine itself, causes the flying machine always to fly to this rest terminal for example when faults occur. In a further advantageous embodiment, the rest terminal is also configured as a charging device for electrically charging the flying machine or batteries of the flying machine.

Here, it is possible in particular that a charging connection is activated simply by the flying machine flying to the terminal, without manual intervention. Thus for example the flying machine may have contact points which make contact with corresponding contact devices of the rest terminal when the machine flies to the rest terminal. It would however also be possible for the flying machine to be charged inductively, so that for example both the flying machine and the rest terminal have corresponding induction coils to allow this inductive charging.

In a further advantageous embodiment, the apparatus comprises a collision prevention device which prevents a collision of the flying machine with movable or immovable objects. In such apparatus for treating containers or packages, numerous obstacles may stand in the flight path of the flying machine, for example machine columns and similar. The objects may however also be human objects or persons with whom collision (with the flying machine) must be avoided. In the present case, it must be considered that, in contrast to the use of drones, the user often does not see the actual drone because for example he is working at a control unit but the drone is recording a different region of the machine. In this case, the flying machine (also called a drone) should itself detect whether obstacles are present in its flight path. The drone must in particular also be able to avoid movable obstacles. Thus for example, a control system may be provided which causes the flying machine to deviate from predefined flight path in order to fly around an obstacle.

Thus for example, it would be possible for the flying machine to have a radar system which detects obstacles in the flight path of the flying machine. It would however also be possible for the image recording device or camera itself to serve to detect obstacles. Thus for example it would be possible for the image recording device always to be oriented in the direction of the flight path, in order thus to detect obstacles lying in the flight path ahead of the flying machine. In addition, infrared sensors could be provided which detect the approach of the flying machine, in particular towards people.

In general, it is possible that the flying machine can detect persons inside its flying region. Thus it can detect whether any persons are standing in areas which are dangerous for them. In this case, this information could be output from the flying machine to the control device, and the control device can trigger certain reactions. Thus for example an alarm could be triggered or an (emergency) stop of the plant.

In a further advantageous embodiment, the apparatus comprises at least one fault detection device which is suitable and intended for detecting faults in the treatment device. Advantageously, the control device controls the flying machine as a function of a fault detected by the fault detection device. Thus for example, the fault detection device may detect a fault in the first treatment device, and the control device may then give the flying machine the instruction to fly to the area in which the fault has very probably occurred. In this way, a fault position can be recorded automatically or the flying machine can fly automatically to the area of the machine or plant in which a fault has occurred.

Advantageously, this fault detection device is suitable and intended for reporting or communicating faults to the control device of the flying machine. Preferably, several treatment devices comprise such fault detection devices, and preferably all treatment devices comprise such fault detection devices. These may for example be devices which detect when fluids have run out or if plastic preforms or bottles have become stuck during transport. They may also be inspection devices which detect faulty containers. The fault detection devices may also be electrical measuring devices which detect for example the presence of currents characteristic of a fault. In addition, it is also possible that firstly faults are detected, then these are inspected by the flying machine, and then eliminated by the user (in some cases however, also automatically by the flying machine).

In a further advantageous embodiment, at least one of the treatment devices is a filling device which fills containers with a fluid and in particular with a beverage. In a further preferred embodiment, at least one treatment device is a blow-moulding machine which forms plastic preforms into plastic containers. In a further advantageous embodiment, the apparatus may also comprise a transport device which transports packaging means and in particular containers from the first treatment device to the second treatment device.

It would however also be conceivable that a machine operator activates an input or specifies a destination via the control device. This input of a destination may take place via an image depiction of the plant, but it would also be possible that, on occurrence of a specific fault, the user receives suggestions of where the fault may be located, and the user sends the drone to the fault site which he considers possible in order to record images and/or videos.

In a further advantageous embodiment, it would also be possible for the user initially to prespecify an approximate destination for the flying machine, but then still have the possibility of changing the position of the flying machine at the destination within specific limits, for example in order to achieve more precise depictions of the possible fault cause.

It would also be possible that a movement of the image recording device can be controlled relative to a carrier of the flying machine. Thus for example a pivot position of the image recording device relative to a carrier can be controlled, for example a pivot position relative to a vertical or horizontal axis. In this way, the user can change the region to be observed even without the flying machine moving. It would also be possible for further parameters of the image recording device to be controlled, such as an image resolution or an optical zoom.

In a further advantageous embodiment, the apparatus could have observation positions to which the flying machine can fly. In operation, it would be possible for the flying machine to fly to such a position, which may comprise a carrier for the flying machine, and there come to rest, and for the image recording device to take images from this rest position. In this way, in case of need, very steady images of possible fault sources could be recorded.

In a further advantageous embodiment, the flying machine has an illumination device. Advantageously, the flying machine has an illumination device which is suitable and intended for illuminating the site observed by the image recording device. This may be useful in particular if it is necessary to record images at dark places on a machine.

Here, it would also be possible that for example such an illumination device is coupled to the image recording device, so that if necessary a possible destination can always be illuminated by the illumination device.

In a further advantageous embodiment, the flying machine has a charge state detection device which detects a charge state of a battery of the flying machine. Thus it is possible that such a detection device detects when the charging capacity of a battery of the flying machine is running low. In this case, the flying machine may itself return to its destination or to the charging station. In a further advantageous embodiment, it would be conceivable for a control device to control the flight path of the flying machine such that this rises vertically from its rest position, then at a greater height flies to a destination and there again drops vertically down insofar as there are no obstacles in this direct vertical path.

In a further advantageous embodiment, the apparatus comprises a clean room within which the containers or packaging materials are transported. Thus for example the containers may be filled inside such a clean room, or plastic preforms formed into plastic containers inside a clean room. Containers could be sterilised within such a clean room. Advantageously, the flying machine is suitable and intended for flying inside such a clean room. This may be advantageous since the clean room need not be opened for inspection purposes. It is also conceivable that the flying machine can fly inside the clean room to regions which would be dangerous for people. Here, it is possible that rest positions are provided inside the clean room to which the flying machine can fly, or specific positions at which the flying machine can dock in order to allow stationary inspections with the image recording device.

In a further advantageous embodiment, it is possible to switch to a manual operating mode. If for example the flying machine or drone does not detect the fault source, the user can take control thereof in order to inspect the plant.

In addition, it is possible that the flying machine is integrated in the plant concept and preferably can receive instructions via a control system to fly in oriented fashion to the machine when a fault is reported, discover the fault, and as applicable eliminate the fault or inform a plant operator.

In addition, the flying machine described here may also be used for a product change or format part change. Thus it is for example possible that the flying machine cooperates with robots or fault tolerant system (FTS) (driverless transport systems) already integrated in the plant, and/or exchanges information therewith. In addition, it would be conceivable that the flying machine itself performs a format part change automatically.

The present invention is furthermore directed at a method for operating apparatus for treating containers and/or packages, wherein the containers and/or packages are treated by a first treatment device in a first predefined fashion and treated by a second treatment device in a 20 second predefined fashion, and furthermore transported by means of a transport device. This may for example be a transport of the containers from the first treatment device to the second treatment device. However, the containers are also preferably transported for at least part of the time during their treatment. This means that the treatment devices themselves preferably also comprise transport devices for transporting the containers.

Furthermore, for at least part of the time, the apparatus is monitored by means of a monitoring device. According to the invention, as part of the monitoring with the monitoring device, and unmanned remote-controlled flying machine comprising an image recording device flies to predefined areas of the apparatus and takes at least one image of this at least one area, and preferably several such predefined areas.

It is therefore proposed according to the method that the apparatus is monitored by means of an unmanned flying machine. The term "monitoring" here means both monitoring in ongoing or normal operation and also monitoring in particular on occurrence of faults. The monitoring may also be routine monitoring during a normal working operation. It may also concern detecting persons and/or foreign bodies in certain areas of the plant.

Preferably, the flying machine flies for at least part of the time to areas of the apparatus in which faults occur. In this way it is possible for a user to detect faults in areas of the plant without being able to see these directly for himself. Advantageously, the images may be several images or also videos. Preferably, to this end, faults on the apparatus are detected by means of a fault detection device and the flying machine may be controlled depending on such detected faults, e.g. instructed to fly to the areas of these faults.

In a further preferred method, the flying machine or the image recording device transmits data which are characteristic of the images and/or videos recorded. In a further preferred method, the images recorded by the image recording device are output to a user.

In a further preferred method, the flying machine flies to these predefined areas by means of predefined flight paths. This means that the flying machine is not controlled by the user but for example can fly to certain areas of the machine on the basis of a program. Thus for example it would be possible that, in the event of a fault, the site at which the fault has occurred is identified and the flying machine automatically flies to this site. It would however also be possible that the flying machine is controlled by the user. Preferably, the flying machine for at least part of the time transports objects by means of a holding and/or gripper device. These objects may for example be tools or also materials such as adhesive and similar, as stated above.

In a further preferred method, an action area of the flying machine is limited. This means that the flying machine cannot leave certain predefined areas, and in particular predefined areas of the apparatus. As stated above, such apparatus are normally located in closed rooms so that the action area of the flying machine would be limited by the walls of these rooms. Preferably however, relative to this, tighter limits are provided so that collisions with walls or similar can be prevented in advance.

In a further preferred method, the flying machines do not fly to the destination area via the shortest route. The reason for this is that the shortest route may possibly contain obstacles. Thus it would be possible that firstly, the flying machine rises in the vertical direction within the flight path until it reaches a height at which no further obstacles are present, then it flies to a destination area inside this region and there drops again.

It would also be possible for specific channels or flight corridors to be created for the flight path of the flying machine and be used as required. In this way, on conversions of the respective apparatus, it need merely be ensured that no obstacles are erected in these flight paths or flight sectors.

Preferably however the flying machine is able to avoid any obstacles present (in some cases also people).

In a further advantageous method, the flying machine for at least part of the time flies to a rest or charging terminal in order to be charged there.

Advantageously, the flight route of the flying machine is determined or influenced by means of a plurality of transmission devices. In this case, a plurality of beacons may be provided using which the flying machine determines its position and corrects this if required. Thus as stated above, so-called radio beacons could be used for navigation which serve for orientation in radio navigation. These beacons usually have precisely known positions. Such radio beacons are known as RBN. In order to determine the actual location of the flying machine, it would be possible for the individual beacons to be located at the destinations. It would however also be possible for the beacons to be located at other sites, and for the actual position of the flying machine to be determined by methods such as cross-bearings.

Advantageously, the method for treating the containers is a method which is selected from a group of methods comprising labelling processes, filling processes, blow-moulding processes, palletising processes and similar. Advantageously, the containers to be treated are plastic containers.

Advantageously, several method steps are performed on the containers and/or packaging means, such as filling processes, forming processes, in particular blow-moulding processes, labelling processes, printing processes, sterilisation processes, closing processes and similar.

BRIEF DESCRIPTION OF THE DRAWINGS

Further advantages and embodiments arise from the enclosed drawing. The drawing shows:

FIG. 1 A diagram depicting an apparatus according to the invention for treating containers.

DETAILED DESCRIPTION OF THE INVENTION

FIG. 1 shows a diagrammatic depiction of an apparatus 1 according to the invention for treating containers 10. This exemplary arrangement has a plurality of treatment units 2, 4, 6, 12, 14, 16 which treat containers 10 in a predefined fashion. The treatment unit 2 may thus for example be a heating unit or an oven for heating plastic preforms. The treatment unit 4 may for example be a forming device for forming plastic preforms into plastic containers. Reference sign 6 may refer for example to a sterilisation unit for sterilising containers, reference sign 12 to a filling device for filling containers, reference sign 14 to a closing machine and reference sign 16 to a unit which combines several containers into packages. Between these individual treatment units, transport devices 8 are provided. These are indicated merely roughly diagrammatically in FIG. 1. In practice, these may in particular be transport stars which transport the containers from one treatment unit to the next treatment unit. In some cases, these may be so-called pitch delay stars which change, for example enlarge, the pitch between individual containers.

Each of these treatment units here preferably has a transmission device 55, a so-called beacon, which serves to orient a remote-controlled flying machine.

Preferably, the apparatus has however at least three such transmission devices.

Reference sign 13 refers to a room in which the apparatus is arranged, such as a machine room. Inside this room, preferably a limiting device 30 is provided, for example in the form of a peripheral conductor or a plurality of electrical conductors arranged at various height positions. This limiting device 30 ensures that the flying machine 20 cannot leave the region enclosed by this limiting device. In this way, for example, collisions with walls delimiting the room can be avoided.

The limiting device thus preferably comprises both said transmission devices and the receiving device of the flying machine 20. A GPS-based system would also be conceivable which limits the flying area of the flying machine. Here again, the limiting device 30 can predefine positions or flying areas, in particular flight corridors through which the flying machine can pass.

The flying machine 20 here has four propeller drives 25 and a carrier 22 on which an image recording device 24 is arranged. This image recording device 24 is here arranged pivotably on the carrier 22, so that for example it can rotate relative to the carrier 22 about an axis standing vertically to the drawing plane, and also for example swivel in a plane standing vertically to the drawing plane. In this way, it is possible that the image recording device 24 can detect complete peripheral images. With a corresponding design, it would be possible for the image recording device to record images above the individual rotors 25. In this way, the flying machine 20 can fly for example to a region below a fault point and the image recording device 24 could look up.

Reference sign 34 designates an illumination device which is here arranged on the image recording device. This illumination device could for example illuminate dark areas if required, so that these can be recorded favourably by the image recording device 24.

Reference sign 26 designates a receiver device which is suitable and intended for receiving radio signals output by the individual transmission devices 51, 52 and 55. Reference sign 32 in turn designates a transmission device which can transmit data, in particular data for images recorded by the image recording device 34. In addition, the flying machine 20 may also have a further control device 50 for controlling the flight mode. This further control device 50 may for example allow an automatic flight of the flying machine to certain target coordinates.

Reference sign 40 designates one such (stationary) control device for controlling the flying machine. For example, the control device may control the flying machine such that it flies in and/or into the area of a treatment unit 2, 4, 6, 12, 14, 16. The flying machine 20 may here be controlled by the user himself, but however automatic control of the flying machine is also possible, such as by an instruction to fly to an area in which a fault has occurred.

Reference sign 42 designates an input device via which for example the user can give instructions to the flying machine. Reference sign 44 designates an image display device such as a screen, via which the images and/or video sequences recorded by the image recording device 24 of the flying machine 20 can be output to the user. The latter can thus inspect the plant remotely. The control device 40 and/or the image display device 44 may also here be configured so as to be mobile. For example, smart phones may be used which can display the images recorded by the image recording device.

Reference sign 54 designates fault detection devices which serve to detect faults occurring at the individual treatment devices 2, 4, 6, 12, 14, 16. These fault detection devices may report faults to the control device 40. In this way, the corresponding fault site can be inspected in a targeted fashion.

Furthermore, it would also be possible that inside a housing, a clean room is formed within which the containers are transported. This clean room could then surround the treatment devices shown here, but it would also be possible for a clean room to be made smaller and contain only one machine, for example a blow-moulding machine, or also a transport path of the containers. In this case, it would be conceivable for the flying machine 20 to fly inside such a clean room. This embodiment offers the advantage that a clean room need not be opened for inspection purposes. Also, in many applications, for example with sterilisation devices, the user may be prevented from coming into contact with hazardous media.

Reference sign 36 designates a rest terminal to which the flying machine 20 (depicted greatly enlarged) may return after use. This rest terminal may also have charging elements 37 which serve to charge the flying machine 20.

Reference sign 38 designates a further rest terminal which is here however arranged on a treatment device 14. In case of need, rest terminals could be provided at which the flying machine docks or lands, in particular if images are to be recorded at these points with a stationary flying machine.

Reference sign 51 designates a transmission device (in particular stationary) which serves in particular for controlling the position of the flying machine 20. The flying machine may orient itself using this transmission device (which in particular is configured as a beacon). Reference sign 52 designates a transmission device which is however elongated. Using these individual transmission devices, as stated, the flying machine 20 can orient itself very precisely and thus fly to the desired flight positions. Furthermore, the flying machine 20 may also comprise a distance measurement device (not shown) which for example allows measurement of a distance from a ceiling of a room in which the apparatus 1 is located. In this way, a height position of a flying machine can be determined very precisely. As stated above, this height determination may also serve for navigation of the flying machine. Thus flight corridors may be provided at a specific height of an apparatus in which no obstacles are situated. This flight corridors could be used to allow the flying machine to fly quickly to desired positions.

The applicant reserves the right to claim as essential to the invention all features disclosed in the application documents insofar as these are novel individually or in combination relative to the prior art. It is furthermore pointed out that in the individual figures, features are described which may be advantageous taken in themselves. The person skilled in the art will immediately appreciate that a specific feature described in one figure may also be advantageous without the use of further features of this figure. The person skilled in the art will furthermore recognise that advantages may result from a combination of several features shown in individual or in different figures.

LIST OF REFERENCE SIGNS

1 Apparatus
2, 4, 6, 12, 14, 16 Treatment devices
8 Transport device
10 Containers
13 Room
20 Flying machine
22 Propeller
24 image recording device
25 Rotors
26 Transmission device (for image transmission)
30 Limiting device
32 Transmission device
34 illumination device
36 Rest terminal
37 Charging elements
40 Control device
42 input device
44 image display device
50 Further control device
54 Fault detection device
51, 52, 55 Transmission devices

The invention claimed is:

1. An apparatus for treating containers and/or packages, with a first treatment device which treats the containers and/or packages in a first predefined fashion, with a second treatment device which treats the containers and/or packages in a second predefined fashion, and with a transport device for transporting the containers and/or packages, and with a monitoring device for monitoring the apparatus, wherein the monitoring device comprises an unmanned remote-controlled flying machine and a control device for wireless control of this flying machine, wherein the flying machine has an image-recording device and wherein the apparatus has a limiting device which limits a flying range of the flying machine, wherein the apparatus has a rest terminal to which the flying machine can fly in a rest position of the flying machine, and wherein the apparatus comprises a fault detector which is configured for detecting faults in the treatment devices, and the control device controls the flying machine as a function of a fault detected by the fault detection device and instructs the flying machine to fly to the areas of the faults.

2. The apparatus according to claim 1,
wherein
the limiting device comprises at least one first signal transmitter configured to emit signals to a first receiving device arranged on the flying machine.

3. The apparatus according to claim 1,
wherein
the flying machine has a signal transmitter configured to emit signals and in particular signals which are characteristic of the images recorded by the image recording device.

4. The apparatus according to claim 1,
wherein
the apparatus has an image outputter configured to output images recorded by the image recording device.

5. The apparatus according to claim 1,
wherein
the rest terminal comprises a charger configured for electrically charging the flying machine.

6. The apparatus according to claim 1,
wherein
the apparatus comprises a collision avoider configured to prevent a collision of the flying machine with movable or immovable objects.

7. The apparatus according to claim 1,
wherein
the apparatus comprises a clean room within which containers are treated, and the flying machine is configured for flying inside the clean room.

8. The apparatus according to claim 7,
wherein
rest positions are provided inside the dean room at which the flying machine can clock in order to allow a stationary inspection with an image recorder.

9. The apparatus according to claim 1,
wherein
the flying machine has a gripper and/or a holder configured for gripping and holding objects.

10. The apparatus according to claim 9,
wherein
the gripper is interchangeable with other grippers.

11. The apparatus according to claim 9,
wherein
the holders are tools or screw elements.

12. The apparatus according to claim 1,
wherein
the flying machine is configured to navigate without GPS signals, wherein the apparatus includes receiving units configured to cooperate with beacons to allow navigation of the flying machine, wherein the beacons are signal transmitters and/or receivers which are arranged stationarily and which emit and/ or receive signals serving for navigation and/or location of the flying machine.

13. The apparatus according to claim 1,
wherein
flying height and extension direction in a plane perpendicular to a vertical direction of the flying machine are limited.

14. A method for operating a device for treating containers and/or packages, wherein the containers and/or packages are treated by a first treatment device in a first predefined fashion and by a second treatment device in a second predefined fashion, and transported with a transport device, wherein for at least part of the time the apparatus is monitored by a monitoring device,
wherein
as part of monitoring by the monitoring device, an unmanned remote-controlled flying machine comprising an image recording device flies to predefined areas of the apparatus and records at least one image of the predefined area, wherein a flying range of the flying machine is limited by the limiting device, and the apparatus has a rest terminal to which the flying machine can fly in a rest position of the flying machine, and wherein faults in the treatment devices are detected by a fault detector, and the flying machine is controlled depending on such detected faults and instructed to fly to the areas of said faults.

15. The method according to claim 14,
wherein
the flying machine flies to the predefined area following predefined flight paths.

16. The method according to claim 14,
wherein
the flying machine for at least part of the time transports objects using a holder and or gripper.

* * * * *